United States Patent
Jones (10) Patent No.: US 9,726,882 B2
(45) Date of Patent: Aug. 8, 2017

(54) DRIVE ELEMENT FOR AN OPTICAL SYSTEM

(71) Applicant: FLIR Systems, Inc., Wilsonville, OR (US)

(72) Inventor: Kevin E. Jones, Portland, OR (US)

(73) Assignee: FLIR Systems, Inc., Wilsonville, OR (US)

( * ) Notice: Subject to any disclaimer, the term of this patent is extended or adjusted under 35 U.S.C. 154(b) by 339 days.

(21) Appl. No.: 14/475,406

(22) Filed: Sep. 2, 2014

(65) Prior Publication Data

US 2016/0061302 A1    Mar. 3, 2016

(51) Int. Cl.
 *G01J 1/04* (2006.01)
 *G02B 26/08* (2006.01)
 *F16H 25/20* (2006.01)
 *G01J 3/06* (2006.01)

(52) U.S. Cl.
 CPC ........... *G02B 26/08* (2013.01); *G01J 1/0403* (2013.01); *G01J 1/0411* (2013.01); *F16H 2025/2081* (2013.01); *G01J 2003/062* (2013.01)

(58) Field of Classification Search
 None
 See application file for complete search history.

(56) References Cited

U.S. PATENT DOCUMENTS 4,867,717 A  * 9/1989 Burmeister ............ B63H 20/20
                                                         440/86
8,385,065 B2    2/2013 Weaver et al.

OTHER PUBLICATIONS

Ruland Manufacturing Co., Inc., "Shaft Collars From Ruland", http://www.ruland.com/shaft-collars.as#about, accessed on Jun. 10, 2015, 2 pages.
Stock Drive Products / Sterling Instrument (SDP/SI), "148 Hub Gears From Sterling Instrument Feature the Patented Fairloc Integral Fastening System", https://sdp-si.com/web/html/newprdfairloc10.htm, accessed on Jun. 10, 2015, 2 pages.

* cited by examiner

*Primary Examiner* — Renee Chavez
(74) *Attorney, Agent, or Firm* — Haynes and Boone, LLP (57) ABSTRACT

Optical system comprising a motor, an optical element, an optical detector, and a linkage that connects operation of the motor to movement of the optical element and the optical detector relative to one another. The linkage may include a shaft and a drive element that operatively connects the shaft to another part of the linkage. In some embodiments, the drive element may include a clamp having a base and a retainer that compressively secure the drive element to the shaft by engagement of a cylindrical surface region of the shaft with the base and engagement of a flat surface region of the shaft with the retainer. In some embodiments, the drive element may include a collar secured to the shaft with a fastener disposed in threaded engagement with a transverse hole defined by the shaft.

16 Claims, 8 Drawing Sheets

DRIVE ELEMENT FOR AN OPTICAL SYSTEM

Optical instruments with moving optics, such as zoom and focus lenses, often utilize drive elements such as gears, levers, and cams attached to the ends of shafts. The drive elements must be compact in order to meet restrictive packaging size requirements and reserve as much space as possible for optics. Also, the drive elements need to be attached reliably to shafts to withstand the loads required for optics movement.

Various existing mechanisms for attachment of a drive element to a shaft are inadequate for an optical instrument. With welding, it can be difficult to obtain a good joint between the shaft and the drive element. The joint usually results in only surface penetration, may be brittle, and can cause softening of the metal. With gluing, adhesives are mostly limited to shear strengths below 400 psi, thus limiting the maximum torque that can be applied to the shaft before the drive element slips on the shaft. A collet may be utilized, but the collet diameter must be very close to the diameter of the shaft, with the collet relying on distortion of the collet to work properly. Ultimately, the friction coefficient under the collet needs to be above a certain value, which can be difficult to achieve in a dirty environment or if oil gets on the shaft at the collet interface. In any event, permanent attachment such as welding, gluing, or a collet, even if robust, does not provide the serviceability desired. Alternatively, a single set screw that engages the outer surface of the shaft can be used to make the drive element removable. However, the set screw only makes contact at one point on the shaft and tends to loosen if the shaft sees reverse cycling. Other removable attachment mechanisms, such as tapered collars, square keys, and splines, are too large and/or costly for use in an optical instrument, and can be inconvenient to dismantle for servicing.

SUMMARY

The present disclosure provides an optical system, which may comprise a motor, an optical element, an optical detector, and a linkage that connects operation of the motor to movement of the optical element and the optical detector relative to one another. The linkage may include a shaft and a drive element that operatively connects the shaft to another part of the linkage. In some embodiments, the drive element may include a clamp having a base and a retainer that compressively secure the drive element to the shaft by engagement of a cylindrical surface region of the shaft with the base and engagement of a flat surface region of the shaft with the retainer. In some embodiments, the drive element may include a collar secured to the shaft with a fastener disposed in threaded engagement with a transverse hole defined by the shaft.

DETAILED DESCRIPTION

The present disclosure provides an optical system, which may comprise a motor, an optical element, an optical detector, and a linkage that connects operation of the motor to movement of the optical element and the optical detector relative to one another. The linkage may include a shaft and a drive element that operatively connects the shaft to another part of the linkage. In some embodiments, the drive element may include a clamp having a base and a retainer that compressively secure the drive element to the shaft by engagement of a cylindrical surface region of the shaft with the base and engagement of a flat surface region of the shaft with the retainer. In some embodiments, the drive element may include a collar secured to the shaft with a fastener disposed in threaded engagement with a transverse hole defined by the shaft.

The present disclosure gives factory assemblers the ability to install a removable drive element onto a shaft, permitting later service or replacement as needed. The drive elements disclosed herein offer design engineers the flexibility to utilize different combinations of gear ratios depending on the design requirements. The drive elements may offer various advantages including a compact geometry, easy removal/replacement, robust attachment to a shaft, and/or the like.

Additional features of optical systems and drive elements according to the present disclosure, as well as exemplary embodiments, are described in the following sections: (I) overview of an exemplary optical system, (II) exemplary drive elements, and (III) optical system with meshed drive elements.

I. Overview of an Exemplary Optical System

Figure 1:
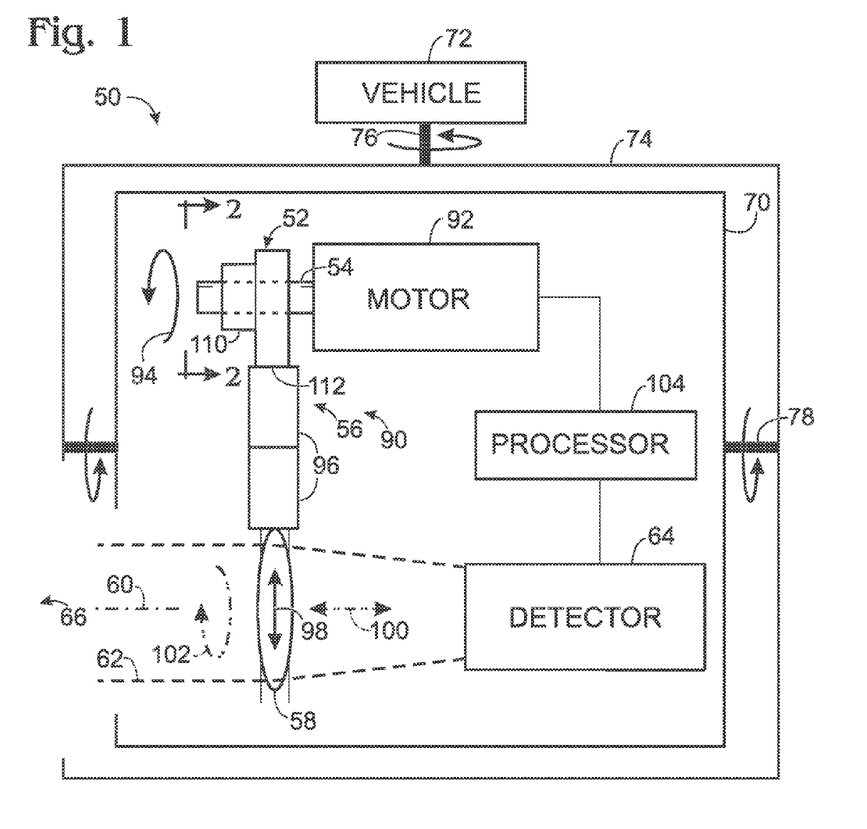
FIG. 1 is a schematic view of an exemplary gimbal-mounted optical system having a drive element disposed on and removably secured to a shaft of a motor, in accordance with aspects of the present disclosure.
Figure 2:
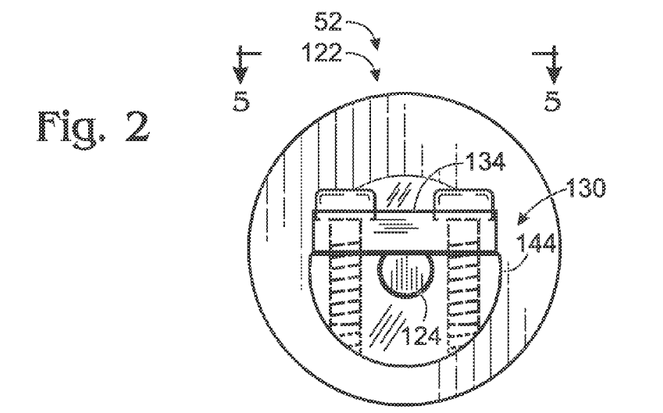
FIG. 2 is an end view of an exemplary cam embodiment of the drive element of FIG. 1, taken generally along line 2-2 of FIG. 1 in the presence of an exemplary motor-driven shaft, with the drive element having a D-shaped collar clamp that secures the drive element to the shaft, in accordance with aspects of the present disclosure.

This section provides an overview of an exemplary optical system 50 including at least one removable drive element 52 attached to a shaft 54 of a drive linkage 56 for an optical element 58; see FIG. 1.

Optical system 50 defines an optical axis or path 60 along which incident radiation 62 is received by an optical detector 64, such as from a field of view 66. Optical element 58 is disposed or positionable on the optical path and may direct at least a portion of the radiation to the optical detector. The optical detector may be sensitive to electromagnetic radiation of any suitable wavelength, including any combination of ultraviolet radiation, visible light, and/or infrared radiation.

Optical system 50 has a frame 70 to support and position other components of the optical system. The frame, in turn, may be supported by a platform 72, such as a vehicle or a building, among others. The frame may have a fixed relation to the platform or may be movable with respect to the platform. For example, the frame may be a gimbal of a gimbal assembly (of two or more gimbals) that pivotably mounts the frame to the platform. In some embodiments, frame 70 may be an inner gimbal that is pivotably supported by an outer gimbal 74, which in turn is pivotably connected to platform 72. The inner gimbal and the outer gimbal may be pivotable about respective transverse (e.g., orthogonal) pivot axes 76, 78. Accordingly, the optical element and the optical detector may be supported by a gimbal assembly configured to drive rotation of the optical axis in a pair of transverse planes, to allow the optical axis to be panned and tilted. Further aspects of suitable gimbals and associated devices for optical system 50 are described in U.S. Pat. No. 8,385,065 B2, issued Feb. 26, 2013, which is incorporated herein by reference.

System 50 has a power train 90 (interchangeably termed a drive train) that drives movement of optical element 58 and optical detector 64 relative to one another. The power train may include a motor 92 mounted to frame 70 and operatively connected to optical element 58 by drive linkage 56. Operation of the motor may generate torque that rotates shaft 54, indicated by a rotation arrow at 94. Shaft rotation may transmit a motive force to optical element 58 via drive element 52 and, optionally, one or more additional link elements 96 of linkage 56. Force generated by the motor may cause any suitable relative movement of optical element 58 and optical detector 64, such as translational motion transverse to the optical axis, indicated by a motion arrow at 98. Alternatively, or in addition, the motor may drive translational movement parallel to the optical axis, indicated by a motion arrow at 100, and/or pivotal movement about the optical axis (or another axis, such as an axis parallel to and offset from the optical axis), indicated by a pivot arrow at 102. Exemplary link elements 96 for optical system 50 may include one or more shafts, gears, levers, wheels, cams, pulleys, belts, cables, or any combination thereof, among others. Each link element 96 may be a moving part operatively disposed between motor 92 and shaft 54, or between drive element 52 and optical element 58, and may be in contact with any of these components.

Optical detector 64 and motor 92 each may be in communication with a processor 104, which may be described as a controller. The processor, which may include one or more digital processors, may send control signals to the motor and/or detector. The processor also or alternatively may receive signals from the motor (and/or an associated encoder that provides positional data about the motor), and/or from the optical detector (e.g., image data). The processor may have any suitable location, such as supported by frame 70 or positioned outside the frame and supported by platform 72 separately from the frame.

Each drive element 52 may have any suitable structure. The drive element may have an attachment portion 110 to secure the drive element to shaft 54. The attachment portion may be disposed against the shaft and may circumferentially surround a region of the shaft. The attachment portion may provide a clamp that adjustably and compressively engages the shaft, such as on flat and cylindrical surface regions of the shaft. Alternatively, or in addition, the attachment portion may include a collar defining an aperture from which a fastener extends into the shaft, such as radially inward with respect to the shaft, optionally for threaded engagement with an internal thread defined by a transverse hole of the shaft. The drive element also may provide an interface portion 112 that contacts and transmits force to another movable link element 96 of drive linkage 56. The interface portion may be disposed outward (e.g., radially outward) of a hub of the drive element. The interface portion may form a gear, a cam, a lever, a sheave, an arm, one or more teeth, or any combination thereof, among others. Further aspects of drive elements 52 that may be suitable are described below in Sections II and III.

Optical element 58 may be any structure or device that collects, directs, and/or focuses optical radiation and/or selectively blocks undesired radiation. An optical element may function by any suitable mechanism, such as refracting, reflecting, diffracting, and/or filtering, among others, optical radiation. Exemplary optical elements include lenses, mirrors, gratings, prisms, filters, beam splitters, transmissive fibers (fiber optics), or the like. The filter may be a wavelength filter, an intensity filter, a polarizing filter, or the like. Exemplary wavelength filters include a band-pass filter, a high or low cut-off filter, a notch filter, or any combination thereof, among others. The filter may block only part of a spectral range, such as blocking only part of the spectral range of infrared radiation, ultraviolet radiation, and/or visible light. In some embodiments, the optical element may be a non-uniformity correction (NUC) element. The NUC element may provide a neutral, uniform-temperature calibration surface for an infrared detector of the optical system, to allow correction for non-uniform sensitivity among pixels of the detector.

Optical detector 64 may include one or more photo-sensitive devices. Exemplary photo-sensitive devices that may be suitable include (1) array detectors, such as charge-coupled devices (CODs), charge-injection devices (CIDs), complementary metal-oxide semiconductor (CMOS) arrays, photodiode arrays, microbolometers, and the like, and/or (2) a single point detector or an array of point detectors, such as photomultiplier tubes (PMTs), photodiodes, pin photodiodes, avalanche photodiodes, photocells, phototubes, and the like. Detectors may be sensitive to the intensity, wavelength, polarization, and/or coherence of the detected radiation, among other properties, as well as spatial and/or temporal variations thereof.

II. Exemplary Drive Elements

This section describes exemplary embodiments of drive elements 52 for optical system 50; see FIGS. 1-11.

FIGS. 2-6 show an exemplary cam element 122 and a motor-driven shaft 124 on which the cam element is removably mounted. The shaft may have a flat surface region 126 and a cylindrical surface region 128 arranged circumferentially on the shaft relative to one another (see FIG. 3). The cam element forms a clamp 130 that secures the element to shaft 124 by application of compressive force to the shaft, such that the element is fixed to the shaft for rotation of the element and the shaft as a unit. The clamp can be adjusted (i.e., loosened or disassembled) to allow the cam element to be removed from the shaft, for servicing off-shaft or replacement with another drive element. Clamp 130 may be described as a collar clamp and/or a D-clamp (also termed a D-shaped clamp or a D-strap clamp).

Figures 3, 4:
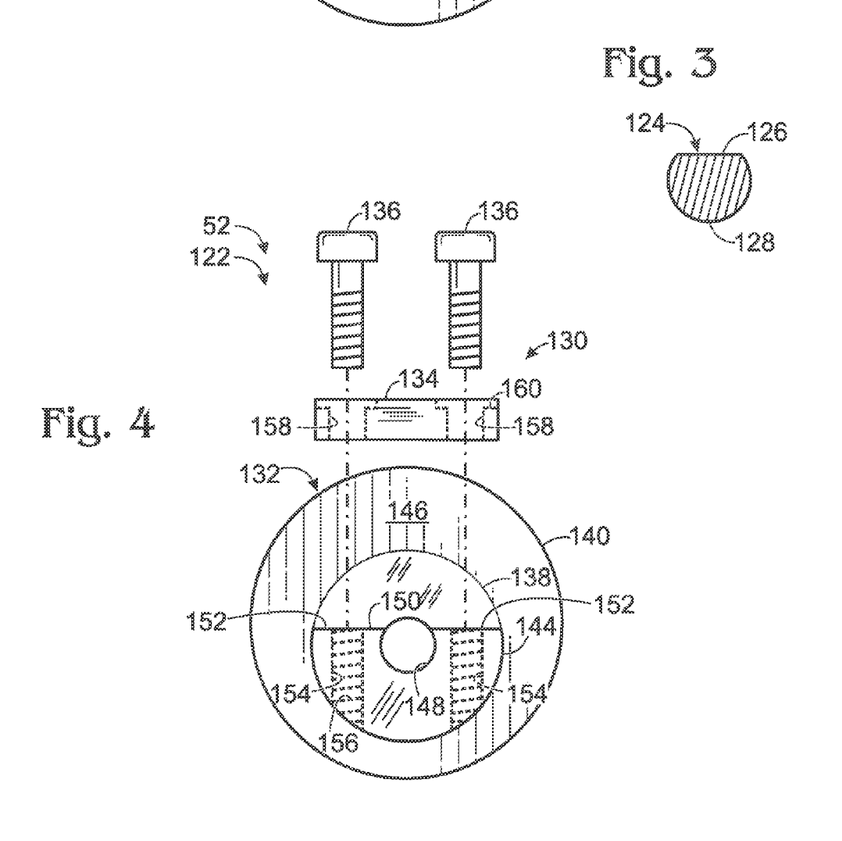
FIG. 3 is a cross-sectional view of the shaft of FIG. 2 taken at a position where the shaft is compressively engaged by the clamp.
FIG. 4 is an exploded view of the drive element of FIG. 2, taken generally as in FIG. 2 in the absence of the shaft.
Figure 5:
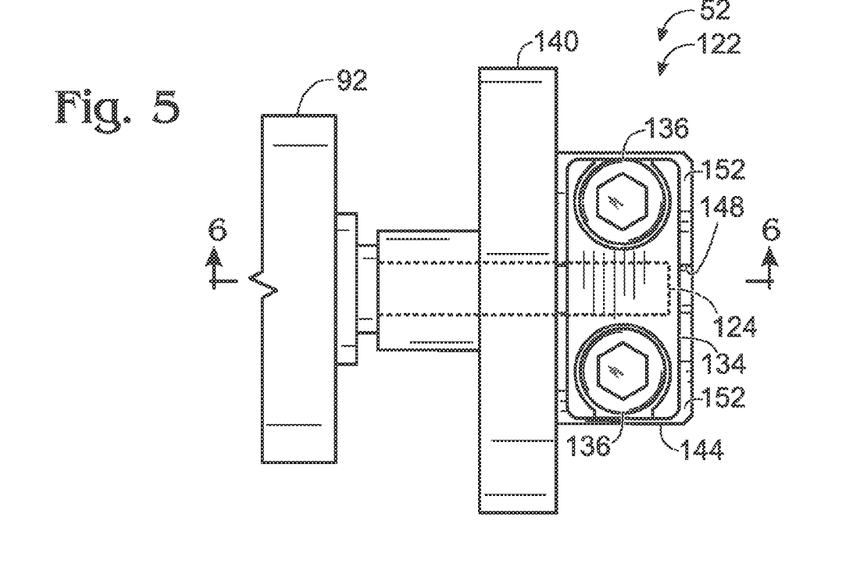
FIG. 5 is a top view of the drive element of FIG. 2, taken generally along line 5-5 of FIG. 2 in the presence of the shaft and a portion of a motor housing from which the shaft extends.
Figure 6:
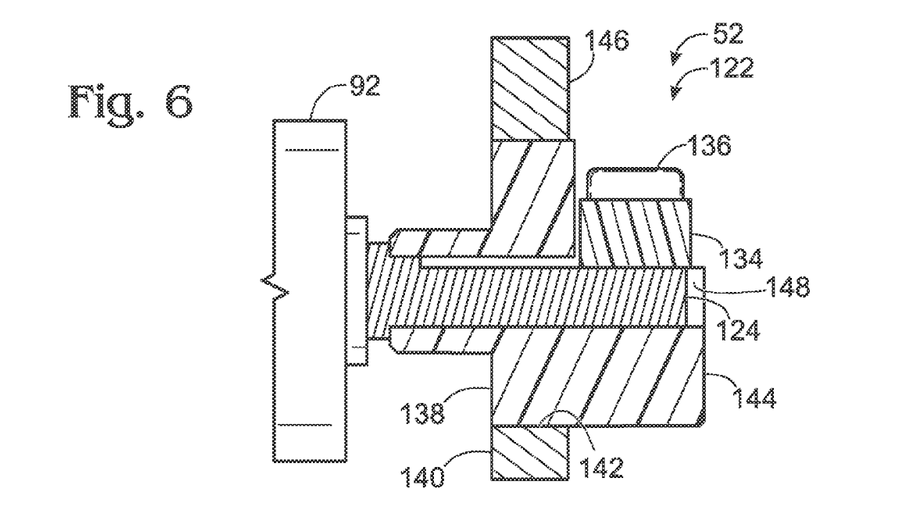
FIG. 6 is a partially sectional view of the drive element and shaft of FIG. 2, taken generally along line 6-6 of FIG. 5.

Cam element 122 may include a body 132, a retainer 134, and one or more fasteners 136 that attach the retainer to the body (see FIG. 4). Body 132, retainer 134, and fasteners 136 may be discrete parts formed separately from one another.

Body 132 may form a hub 138 and a cam portion 140 (as interface portion 112 to contact a link element), which may be attached in fixed relation to one another. The hub and cam portion may be formed integrally with one another. Alternatively, the hub and cam portion may be formed separately from one another, optionally of different materials (see FIG. 6). For example, the hub may be received in an opening 142 defined by cam portion 140, such as by press-fitting the hub into the cam portion (or a different interface portion). In other examples, the hub may be attached to the cam portion (or a different interface portion) by bonding, an adhesive, welding, or the like. The hub and the cam portions (or a different interface portion) may be formed of the same or different materials. For example, the hub may be formed of metal and the cam portion of polymer, or vice versa, among others. Cam portion 140 may project outward from hub 138, away from shaft 124, and may be positioned eccentrically around the hub.

A base 144 of clamp 130 may be formed by body 132, optionally as an axial projection of hub 138 from a face 146 of the body (see FIGS. 2 and 4-6). The base may define an opening 148 configured to receive a portion of shaft 124, such that the base is disposed over cylindrical surface region 128 of the shaft (also see FIG. 3). The base may or may not extend more than halfway around the shaft, and may be at least generally C-shaped when viewed axially (see FIG. 4). An open side 150 of the base may be planar and at least generally aligned with flat surface region 126 of the shaft (see FIGS. 2 and 4). The open side may be composed of a pair of base surface regions 152 separated by opening 148 and optionally arranged substantially coplanar with one another. Base 144 may define one or more holes 154 (e.g., blind holes or through-holes) each having an internal thread 156. In the depicted embodiment, a hole 154 extends into base 144 from each base surface region 152.

Retainer 134 may be attached to base 144 over flat surface region 126 of shaft 124. The retainer may be rigid and may define a pair of apertures 158 that align with holes 154, to allow externally threaded fasteners 136 to extend from the retainer and into threaded engagement with the base at holes 154 (see FIG. 4). The head of each fastener may be engaged with the retainer, optionally in a counterbore 160 defined by the retainer. Each fastener may function as a lag screw that urges the retainer toward the base as the head of the fastener is tightened against the retainer. The retainer may be linear in profile, when viewed axially with respect to shaft 124 (as in FIGS. 2 and 4), and/or may have a planar bottom surface to engage flat surface region 126 of the shaft, while base 144 engages cylindrical surface region 128. In some embodiments, the retainer may be described as a strap, a strap piece, or a bar. In some embodiments, the positions of holes 154 and apertures 158 may reversed, namely, with internally threaded holes 154 defined by retainer 134 and nonthreaded apertures 158 defined by base 144.

Figure 7:
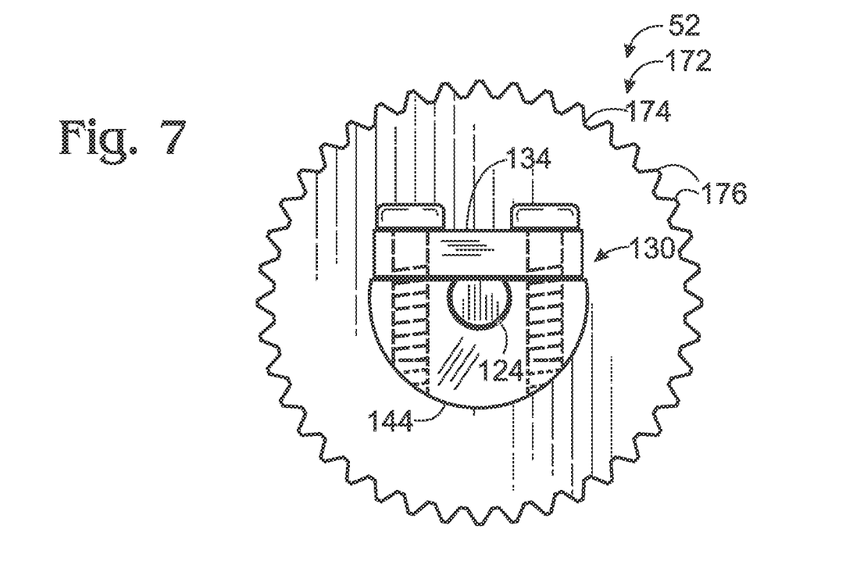
FIG. 7 is an end view of an exemplary gear embodiment of the drive element of FIG. 1, taken generally as in FIG. 2, with the drive element having the same clamp as in FIG. 2, in accordance with aspects of the present disclosure.

FIG. 7 shows an exemplary gear element 172 and a shaft 124 on which the element is removably mounted. Gear element 172 is similar to cam element 122 of FIGS. 2-6 except that a gear portion 174 with teeth 176 is present in place of cam portion 140. Accordingly, gear element 172 may have any suitable combination of the features described for cam element 122. The gear element is shown here as a spur gear but may be structured as any suitable type of gear, such as a helical gear, a face gear, a worm gear, a bevel gear, an internal ring gear, a screw gear, or the like.

Figure 8:
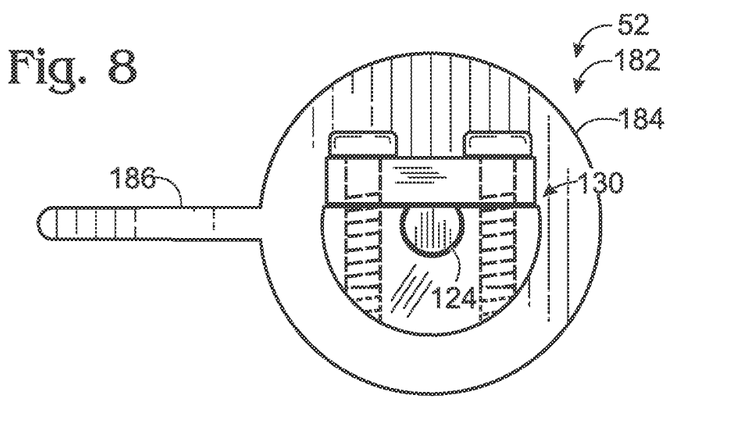
FIG. 8 is an end view of an exemplary lever embodiment of the drive element of FIG. 1, taken generally as in FIG. 2, with the drive element having the same clamp as in FIG. 2, in accordance with aspects of the present disclosure.

FIG. 8 shows an exemplary lever element 182 and a shaft 124 on which the element is removably mounted. Lever element 182 is similar to cam element 122 of FIGS. 2-6 except that a lever portion 184 forming a lever 186 is present in place of cam portion 140. Accordingly, lever element 182 may have any suitable combination of the features described for cam element 122. In other embodiments, lever portion 184 may be replaced by a sheave portion, a wheel portion, or the like.

Figure 9:
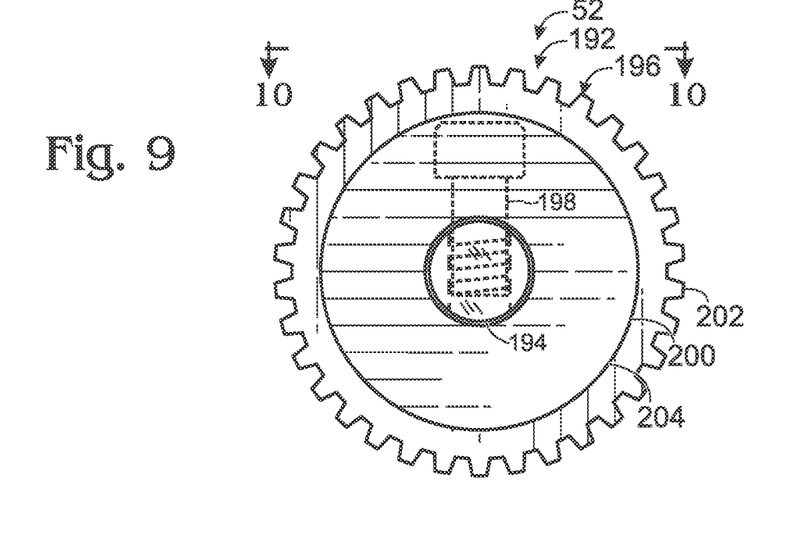
FIG. 9 is an end view of another exemplary gear embodiment of the drive element of FIG. 1, taken generally along line 2-2 of FIG. 1 in the presence of another exemplary motor-driven shaft, with the drive element having a collar disposed on the shaft and secured by a fastener extending into an internally threaded hole of the shaft, in accordance with aspects of the present disclosure.
Figure 10:
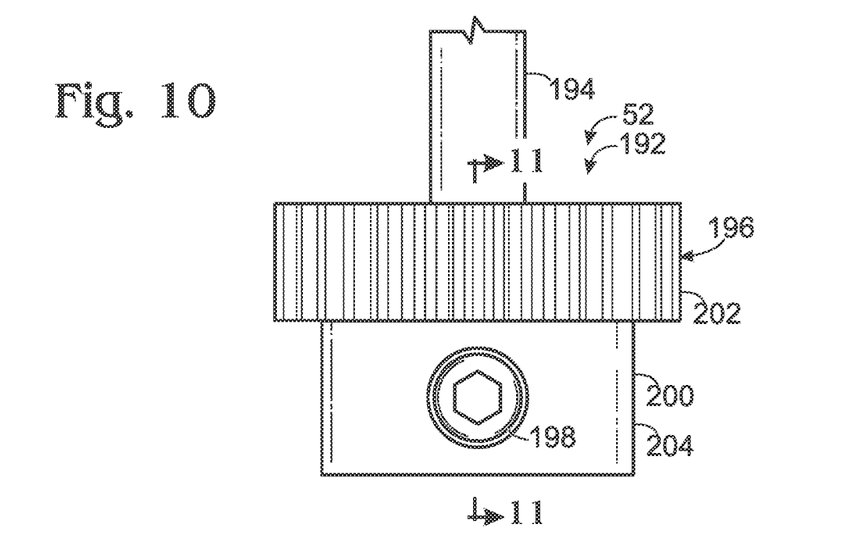
FIG. 10 is a top view of the drive element of FIG. 9, taken generally along line 10-10 of FIG. 9.
Figure 11:
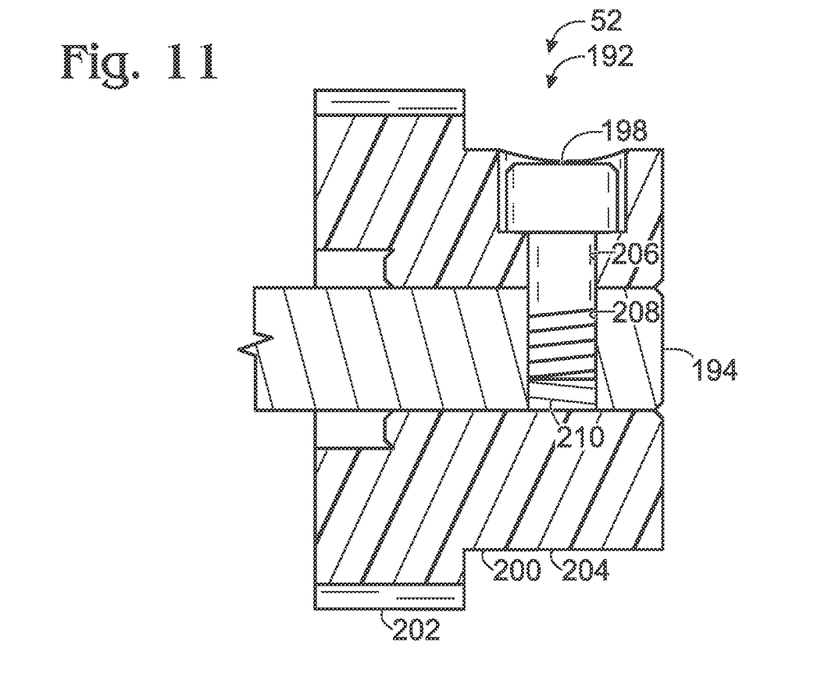
FIG. 11 is a sectional view of the drive element of FIG. 9, taken generally along line 11-11 of FIG. 10.

FIGS. 9-11 show an exemplary gear element 192 and a motor-driven shaft 194 on which the gear element is removably mounted. Gear element 192 may include a body 196 and an externally threaded fastener 198 that attaches the body to shaft 194, such that gear element 192 and shaft 194 rotate as a unit.

Body 196 may include a hub 200 and a gear portion 202 attached to the hub, and optionally projecting radially outward from the hub. The hub and the gear portion may be formed integrally with or separately from one another. The hub may project axially from the gear portion to form a collar 204. The collar may define an aperture 206 to receive a portion of fastener 198 (see FIG. 11). The aperture may be nonthreaded or may have an internal thread for threaded engagement with the fastener.

Shaft 194 may define a hole 208 having an internal thread 210. The hole may extend into (and optionally through) the shaft in a direct transverse to the shaft's rotation axis, such as radially with respect to the shaft. Fastener 198 may extend from aperture 206 of collar 204 into threaded engagement with hole 208, to secure gear element 192 to shaft 194. The head of the fastener may be flush or recessed with respect to the outer surface of collar 204 (see FIGS. 9 and 11) or may protrude from the collar.

III. Optical System with Meshed Drive Elements

Figure 12:
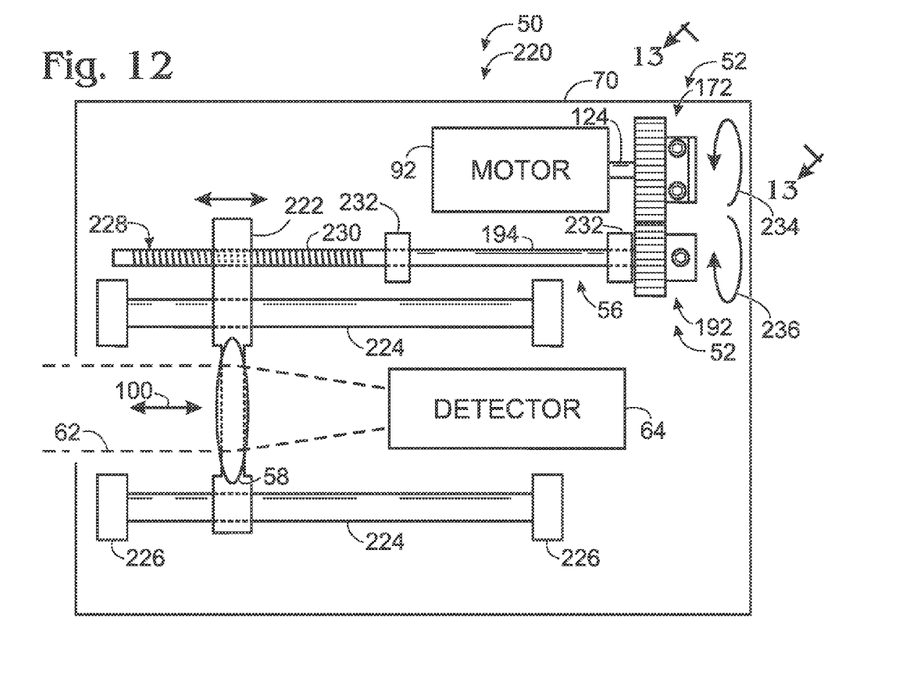
FIG. 12 is a schematic view of selected aspects of an exemplary embodiment of the optical system of FIG. 1 that includes the drive elements of FIGS. 7 and 9 in meshed engagement with one another and attached to respective shafts of the same motor-driven linkage, in accordance with aspects of the present disclosure.
Figure 13:
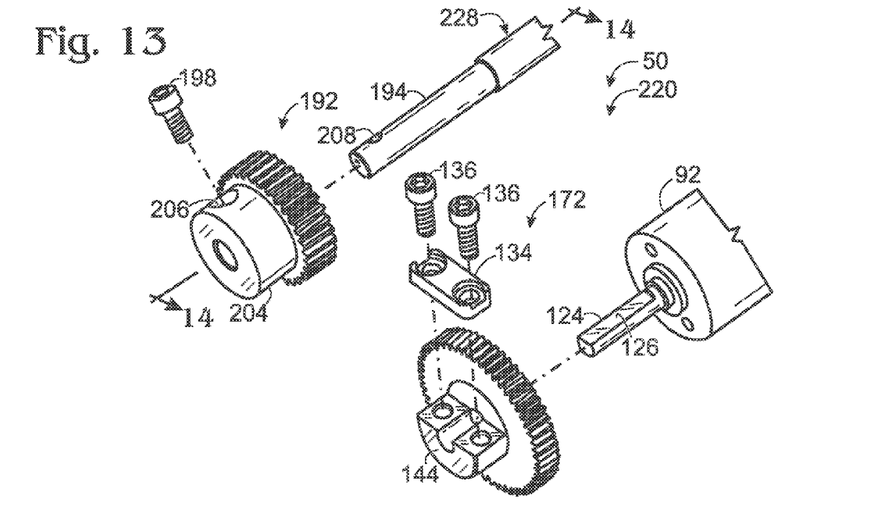
FIG. 13 is a fragmentary, exploded, isometric view of selected aspects of the optical system of FIG. 12, taken generally along line 13-13 of FIG. 12 toward the drive elements.

This section describes an exemplary embodiment 220 of optical system 50 including a pair of drive elements 52 in meshed engagement with one another to connect rotation of a pair of shafts; see FIGS. 12 and 13.

FIG. 12 shows selected aspects of optical system 220 having an optical element 58 that may function as a focusing lens or a zoom lens. The system has a drive linkage 56 that moves optical element 58, indicated by a motion arrow at 100, parallel to the optical axis. The optical element may be attached to and supported by a lens carrier 222 that slides along one or more guides 224. In the depicted embodiment, guides 224 include a pair of laterally-spaced guide rods fixed to frame 70 with brackets 226.

Translational motion of lens carrier 222 may be driven by rotation of a lead screw 228 having an external thread 230. The lead screw may be in threaded engagement with an internal thread of lens carrier 222. Lead screw 228 may be rotatably connected to frame 70 with one or more bearings 232 that facilitate rotation of the lead screw about a long axis thereof.

Rotation of a shaft 194 of lead screw 228 may be driven by a motor 92 connected to a motor shaft 124. A pair of drive elements 52 may rotationally connect shafts 124 and 194 to one another for rotation in opposite directions, indicated by rotation arrows 234, 236. More specially, a pair of drive elements in the form of gear elements 172 and 192 (also see FIGS. 7 and 9) may be fixed to the respective shafts and meshed with one another.

Figure 14:
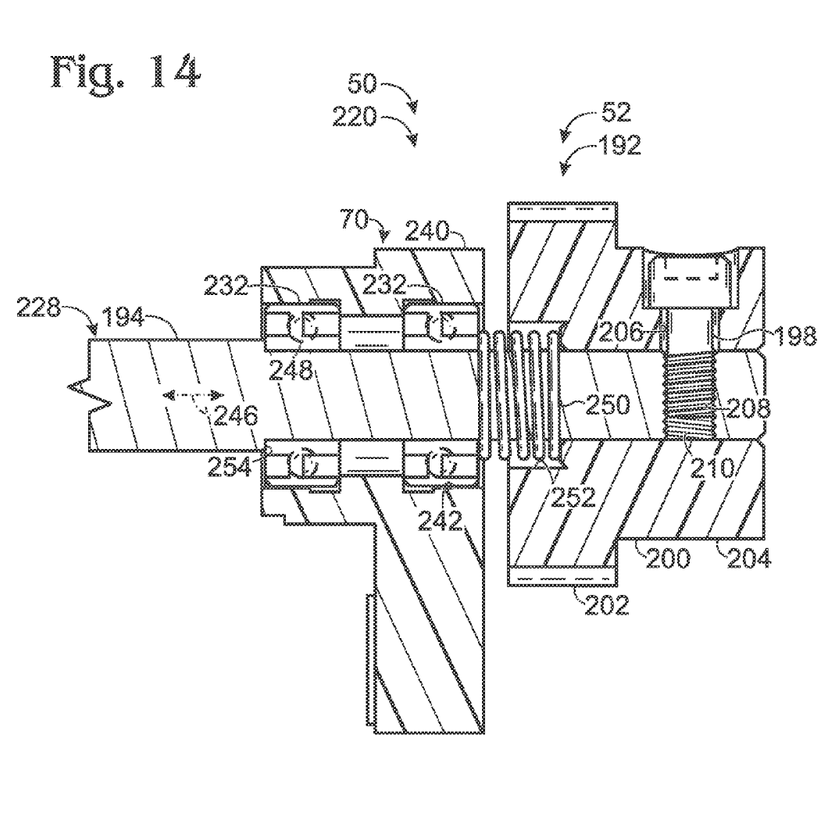
FIG. 14 is a partially fragmentary, sectional view of the optical system of FIG. 12, taken generally along line 14-14 of FIG. 13 through one of the drive elements and a lead-screw shaft to which the one drive element is secured, and showing bearings and a compression spring that are not included in FIG. 13.

FIG. 13 shows an exploded view of gear elements 172 and 192 and shafts 124 and 194, and FIG. 14 shows a sectional view of gear element 192 and shaft 194 taken in the presence of additional components not included in FIG. 13. Shaft 194 may be pivotably supported by a fixed bracket 240 of frame 70 (also see FIG. 12). The bracket may define an opening 242 containing one or more bearings, such as a pair of ring bearings 232, as shown in the depicted embodiment. Each bearing may facilitate rotation of shaft 194 about a long axis 246 thereof through the action of one or more rolling elements 248, which may be spherical, cylindrical, or conical, among others.

A resiliently deformable biasing element 250, such as a spring (e.g., a compression spring or a tension spring, among others), may be disposed intermediate drive element 192 and bearings 232. Biasing element 250 may be disposed around shaft 194 and may be located at least partially in a recess 252 defined by drive element 192. The biasing element may be deformed from its resting configuration during assembly of the optical system, to preload the biasing element (i.e., place the biasing element in a deformed, preloaded configuration), which, in turn, may directly or indirectly apply axial loads to drive element 192, shaft 194, and/or bearings 232, in a direction substantially parallel to long axis 246 of the shaft. The axial loads may urge drive element 192 and shaft 194 to the right in FIG. 14, such that a shoulder 254 of shaft 194 engages a bearing 232. The biasing element also may apply a load to the same or a different one of bearings 232 from the opposite direction, which loads the bearings to remove play, if any, from the bearings, and establishes and maintains the axial position of shaft 194 (and thus lead screw 228). The axial loads urges drive element 192 rightward in FIG. 14, toward the end of the shaft 194. However, fastener 198 secures the drive element in position on the shaft, thereby insuring that the biasing element will be kept in the preloaded configuration, and the loads applied by the biasing element will not be released, by preventing the drive element from slipping off the shaft.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure. Further, ordinal indicators, such as first, second, or third, for identified elements are used to distinguish between the elements, and do not indicate a particular position or order of such elements, unless otherwise specifically stated.

I claim:

1. An optical system, comprising:
   a motor;
   an optical detector;
   an optical element positioned or positionable on an optical path extending to the optical detector; and
   a linkage that connects operation of the motor to movement of the optical element and the optical detector relative to one another, the linkage including (a) a shaft having a flat surface region and a cylindrical surface region arranged around the shaft from one another, and (b) a drive element that operatively connects the shaft to another part of the linkage and including a clamp having a base to receive at least part of the cylindrical surface region and a retainer attached to the base with a pair of threaded fasteners that have the flat surface region of the shaft located between them, such that the clamp secures the drive element to the shaft by engagement of the cylindrical surface region with the base and engagement of the flat surface region with the retainer.

2. The optical system of claim 1, wherein each threaded fastener is a lag screw disposed in threaded engagement with the base and not the retainer.

3. The optical system of claim 1, wherein the drive element includes a gear portion, and wherein the gear portion is offset axially from the clamp.

4. The optical system of claim 1, wherein the base is at least generally C-shaped in a profile view taken parallel to a long axis of the shaft.

5. The optical system of claim 4, wherein the clamp is at least generally D-shaped in the profile view.

6. The optical system of claim 1, wherein the base extends more than half way around the shaft.

7. The optical system of claim 1, wherein the drive element includes a hub and also includes an interface portion selected from the group consisting of a gear portion, a cam portion, a lever portion, and a wheel portion, and wherein the interface portion is fixed to the hub and movably contacts a part of the linkage other than the shaft.

8. The optical system of claim 7, wherein the hub is formed of metal and the interface portion is formed of polymer.

9. The optical system of claim 7, wherein the hub has a press-fit attachment to the interface portion.

10. The optical system of claim 1, wherein the motor, the optical element, the optical detector, and the linkage are supported by a pair of gimbals configured to drive rotation of the optical path in each plane of a pair of planes that are transverse to one another.

11. The optical system of claim 1, wherein the optical element includes a lens, a mirror, a filter, or a combination thereof.

12. The optical system of claim 11, wherein the optical element includes a zoom lens, a focusing lens, or a combination thereof.

13. The optical system of claim 1, the shaft being a first shaft and the drive element being a first drive element, wherein the linkage includes a second shaft defining a transverse hole having an internal thread, wherein the linkage also includes a second drive element that operatively connects rotation of the first drive element to rotation of the second shaft, and wherein the second drive element includes a collar defining an axial opening to receive at least a portion of the second shaft and a transverse aperture to receive a fastener that extends from the transverse aperture and into the transverse hole of the second shaft for threaded engagement with the internal thread, to secure the second drive element to the second shaft.

14. The optical system of claim 13, further comprising a frame and at least one bearing that facilitates rotation of the second shaft with respect to the frame, and also comprising at least one biasing element having a preloaded configuration that applies a load to the at least one bearing in a direction substantially parallel to a long axis of the second shaft, wherein the second drive element keeps the at least one biasing element in the preloaded configuration.

15. The optical system of claim 14, wherein the at least one biasing element includes a spring disposed around the second shaft at a position intermediate the second drive element and the at least one bearing, and wherein the spring is compressed in the preloaded configuration.

16. The optical system of claim 14, wherein the second shaft includes a shoulder, and wherein the preloaded configuration of the at least one biasing element urges the shoulder against a bearing of the at least one bearing to maintain an axial position of the second shaft.

\* \* \* \* \*